United States Patent [19]
Ethington et al.

[11] Patent Number: 5,704,022
[45] Date of Patent: Dec. 30, 1997

[54] PRINTER WITH HIGH BANDWIDTH COMPRESSION ARCHITECTURE

[75] Inventors: Bryan Leslie Ethington, Lexington; John Francis Gostomski, Winchester; Jeffrey Alan Minnick; Christopher Mark Songer, both of Lexington, all of Ky.

[73] Assignee: Lexmark International, Inc., Lexington, Ky.

[21] Appl. No.: 641,872

[22] Filed: May 2, 1996

Related U.S. Application Data

[60] Provisional application No. 60/004,192, Sep. 22, 1995.
[51] Int. Cl.$^6$ .................................................. G06K 15/00
[52] U.S. Cl. .................................. 395/115; 395/117
[58] Field of Search .................... 395/102, 115, 395/116, 117, 112, 507, 508, 510, 521; 358/462; 382/305, 282, 232, 237, 195

[56] References Cited

U.S. PATENT DOCUMENTS

| | | | |
|---|---|---|---|
| 5,023,813 | 6/1991 | Brown | 364/519 |
| 5,150,454 | 9/1992 | Wood et al. | 395/114 |
| 5,506,994 | 4/1996 | Gentile | 395/114 |
| 5,521,990 | 5/1996 | Ishizawa | 382/276 |

*Primary Examiner*—Arthur G. Evans
*Attorney, Agent, or Firm*—John A. Brady

[57] ABSTRACT

To process bit maps for full color and other data-intense bit maps for printing, a data processing routine (FIG. 4) determines if a block at data within a page is not in color or is otherwise in a single value. Such data is stored in DRAM (28) in one bit per pel form. Other blocks are stored with eight bit for each pel. A table is then developed defining the contiguous order in a page (FIG. 6). An ASIC (32) then transfers the pel information in order of printing to a video RAM (40) with the eight bits restored for data stored in one bit per pel form. The data applied to that ASIC is decompressed.

12 Claims, 5 Drawing Sheets

LZW Detail

PRINTER WITH HIGH BANDWIDTH COMPRESSION ARCHITECTURE

PRIORITY APPLICATION

Priority is hereby claimed from provisional application by the same title having Ser. No. 60/004,192; filed Sep. 22, 1995.

1. Technical Field

This invention relates to printing data-intense bit maps with moderate memory availability.

2. Background of the Invention

Problems Solved By This Invention

There are three problems solved by this invention.

1: Meeting the high bandwidth requirements of the printing process.

2: Storing a compressed description of page which requires 128 MBytes of data in 8 MBytes or less.

3: Completing both of the above in a timely and performance critical fashion.

Introduction

This printer architecture allows the storage and imaging of pages which require large amounts of memory. These types of pages strain a printer in two different ways. First, actual storage of the page requires high compression ratios or large expensive memory configurations and the printing of the page requires high memory bandwidths. Therefore, this invention applies to both color and monochrome printers, but is more appropriate for color printers which have much higher memory requirements than their monochrome counterparts.

Glossary of Terms

Binary Data: data in which a single bit represents one pel of the page. This implies that each pel can be either on or off and that there are no intermediate values.

Band: term used to describe the amount of data necessary for 1 or more scan lines of the full width the printhead laser traverses. For this printer, a band is composed of 64 scan lines by 5120 bytes per scan line. Each scan line has 5120 pels.

Block: a variable size (in width and height) piece of memory allocated in DRAM used for the purpose of building bands. The blocks may or may not be contiguous in DRAM memory.

Contone Data: Data in which multiple bits represent a single pel of the page. This implies that each pel can take on a multiplicity of values beyond simple on an off.

LZW: UNISYS proprietary compression technique. Ideally suited for hardware implementation.

Plane: The data for all of a specific colorant for a page. This printer contains two modes: 4 plane color and 1 plane black. There are 127 bands per plane.

Renderer: Portion of software which takes the page representation and produces bands from it.

VRAM: Dual ported memory device. A VRAM is identical to a DRAM except that an entire row of data (typically 1K) can be serialized out a second port 32 bits at a time while normal memory access occurs on the regular interface.

DISCLOSURE OF THE INVENTION

There are three aspects of this invention: A method of page representation creation which dynamically decides between one and eight bit block forms; a method of block queuing which at interrupt level uses a table assembled at the rendering level where that table is composed of block characteristics; and hardware designed to assemble a band from blocks which can be either compressed or uncompressed as well as of a bit depth different from the final form required by the print engine.

BRIEF DESCRIPTION OF THE DRAWING

The details of this invention will be described in connection with the accompanying drawing, in which.

Best modes for carrying out the inventory

BEST MODE FOR CARRYING OUT THE INVENTION

Figure 1:
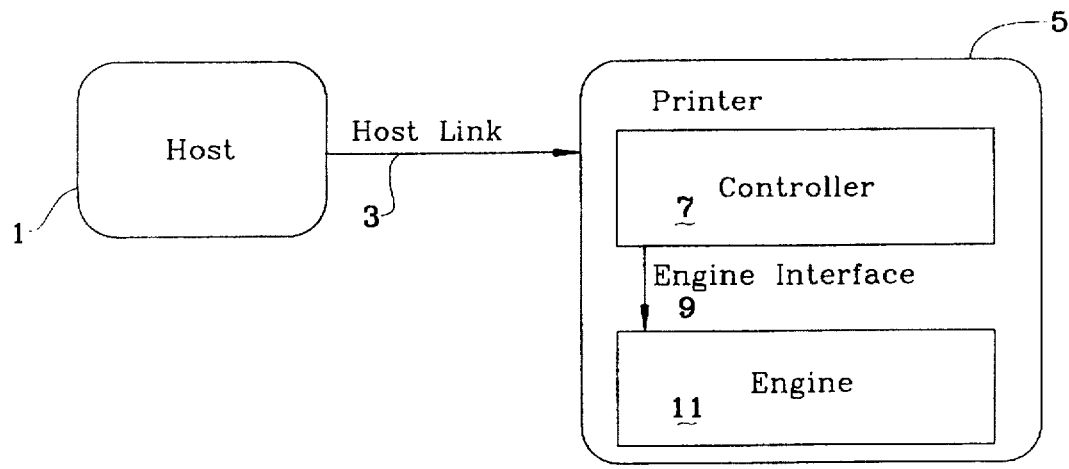
FIG. 1 is a generalized illustration of host with the printer.

The system, at a high level involves a printer and a host. The printer is generally of the kind described in U.S. Pat. No. 5,023,813 by Brown III. At a slightly lower level the system involves a host, a host communication link, a printer controller consisting of a general purpose computing engine, a dedicated hardware assist processor, a print engine communication link and a print engine. Conceptually the system is broken down shown in FIG. 1, a host computer 1, connected on a communications link 3, to a printer 5; printer 5 having a controller 7, an engine interface 9, and an engine 11.

This invention exclusively pertains to the hardware and software comprising the controller—with the sole exception that the invention's purpose is to meet the data demanded across the engine interface. In this particular case, a sustained data rate of 13 MBytes per second is required.

Figure 3:
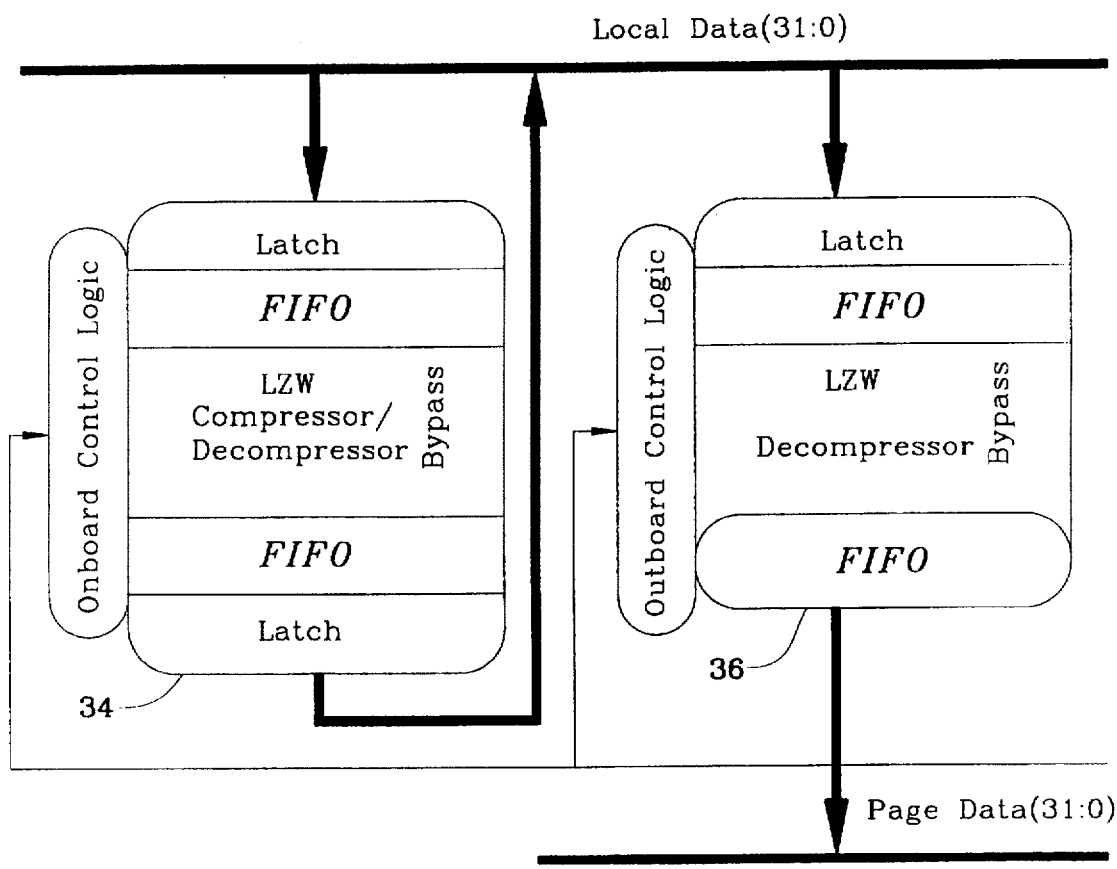
FIG. 3 illustrates compression and decompression in additional detail.
Figure 2:
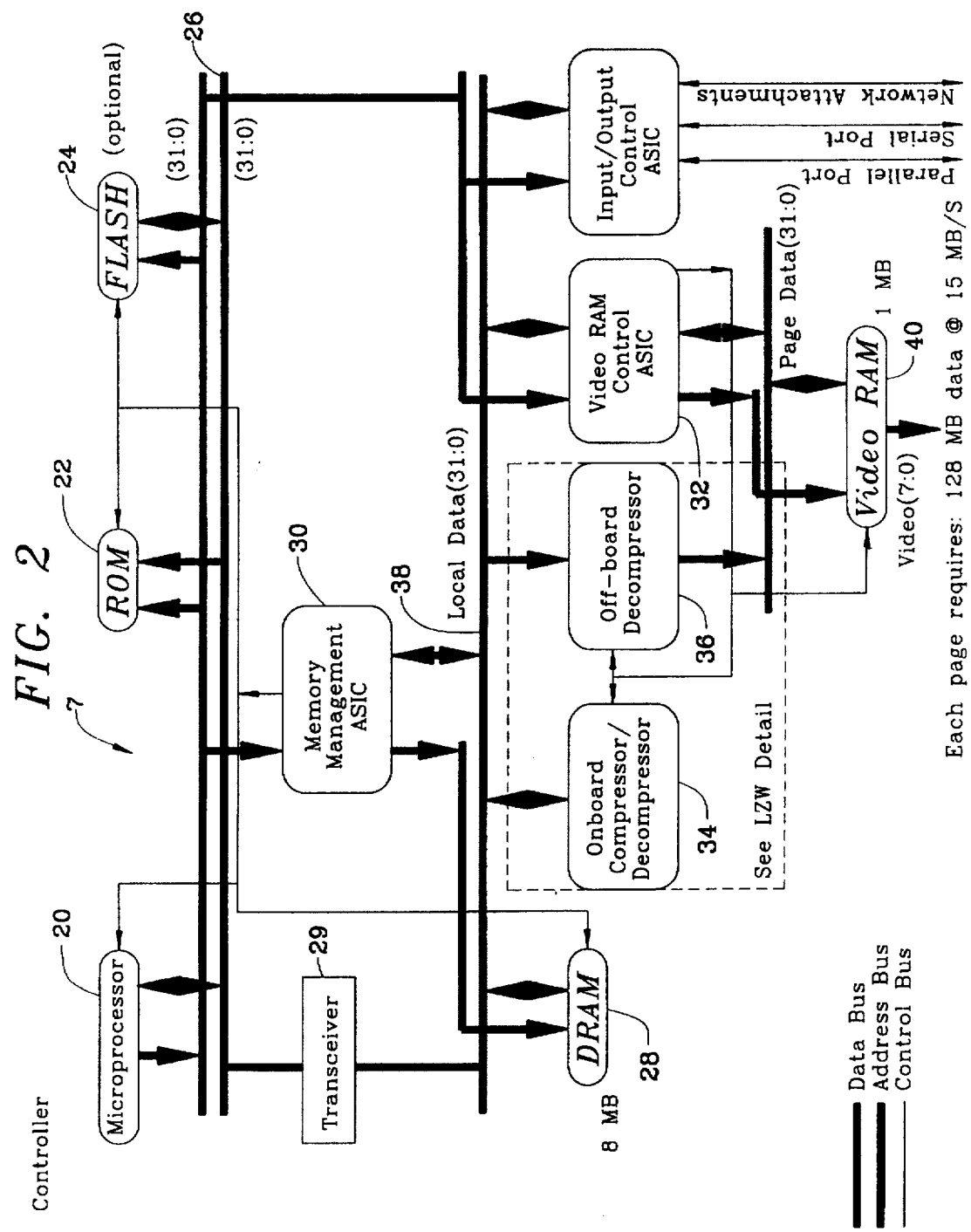
FIG. 2 is a conceptual representation of the controller.

A closer examination of controller 7 yields the layout of FIG. 2, microprocessor 20, read only memory (ROM) 22, flash memory 24, which is optional, connected on a 32 bit bus 26. Bus 26 is connected to an 8 Megabyte dynamic random access memory 28, through an interface transceiver 29. Bus 38 is connected to a memory management integrated circuit 30 and to the video RAM control integrated circuit 32, which is connected to DRAM 28 and onboard compressor/decompressor 34 and off-board decompressor 36 through a 32 bit bus 38. Video RAM (VRAM) 40 receives control signals from ASIC 32 and data from onboard compressor/decompressor 34 and off-board decompressor 36. The onboard element 34 and the off-board element 36 are shown in more detail in FIG. 3. Each has a latch for incoming data, first-in-first-out control and LZW compressor/decompressor (34 only) or an LZW decompressor (36 only), and an output first-in-first-out control, an output latch (34 only), and control logic.

Software Printing Architectural Overview

Before dealing with specifics of the printing process in this printer, it is best to examine software's handling of page creation and the printing process, for this leads to a general understanding of the architectural framework of the printer's operation. Delivery of the datastream to the printer is assumed.

Within the printer lie several software components which are fundamental to the process. The bitmap driver provides a facility to draw low level primitives into a page. The forms of these primitives are limited to edge list fills, rectangles, eight bit image data, orthogonal one bit image data and one bit image masked operations. The location of these primitives must be specified to the bitmap driver in device pels—i.e. in units which do not require scaling or rotation transformations to map them to units on the final page. A limited form of translation is allowed, as long as the same translation applies to all pels in the page representation. The shape of a given primitive may be filled with any bitmap of a fixed size, including all black, all white and halftones.

Because the interface to the bitmap driver does not closely match that which can be described by the page description languages the printer accepts, another software component is needed. This component, the graphics engine, provides more advanced graphic object description than the simple low level primitives the bitmap driver provides. Graphic objects can be described in any sort of transformed space, rather than just device pels. The objects can be constructed of lines, arcs, font outlines, and a variety of other mechanisms and can be filled in a variety of different ways.

Finally, there must be a software component which accepts as input the datastream describing the page and produces as "output" calls into the graphics engine to turn that datastream into the printed page. This component is called the interpreter or more commonly at Lexmark the emulator.

As a brief review, then, it is accurate to say that the printer creates the page in the following way. The emulator takes the datastream and based on that datastream makes calls into the graphics engine. The graphics engine transforms those calls from the emulator into calls to the bitmap driver by taking complex spaces and shapes and turning them into device space low level primitives.

Figure 4:
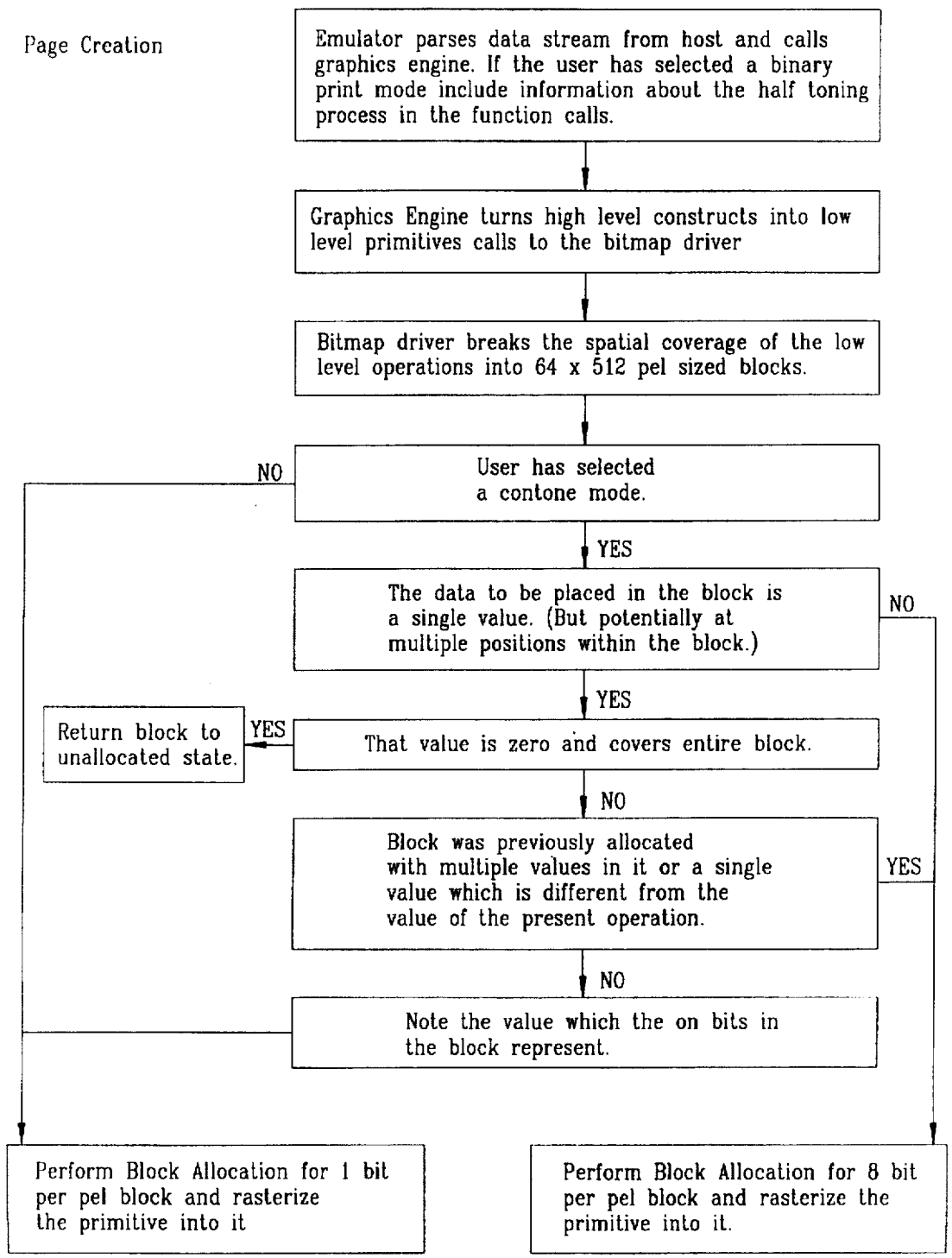
FIG. 4 is a flow diagram of page creation.

It is clear from this description that the bitmap driver is the component responsible for creating and maintaining the page representation stored in DRAM. This representation of the completed page must be finished before the printing of the page can begin. For a four plane image, the page may require up to 166,461,440 bytes of DRAM. As a result, the process of page creation in the bitmap driver requires some unusual efforts to make sure that the page will both fit into DRAM (which can be as much as 20 times smaller than the data required for the page) and will be created in a timely fashion. This page creation is done as shown in FIG. 4.

If the user has not selected a continuous tone mode (in which the level of tone are defined by 8 bits for each pel), the data processor proceeds directly to block allocation for 1 bit per pel. If the 8 bit level is not a single value, the data processor proceeds directly to block allocation for 8 bits per pel. If the data in the block is a single value and the block has no previous allocation of different value, the block allocation is for one bit per pel, otherwise it is for 8 bits per pel.

Figure 5:
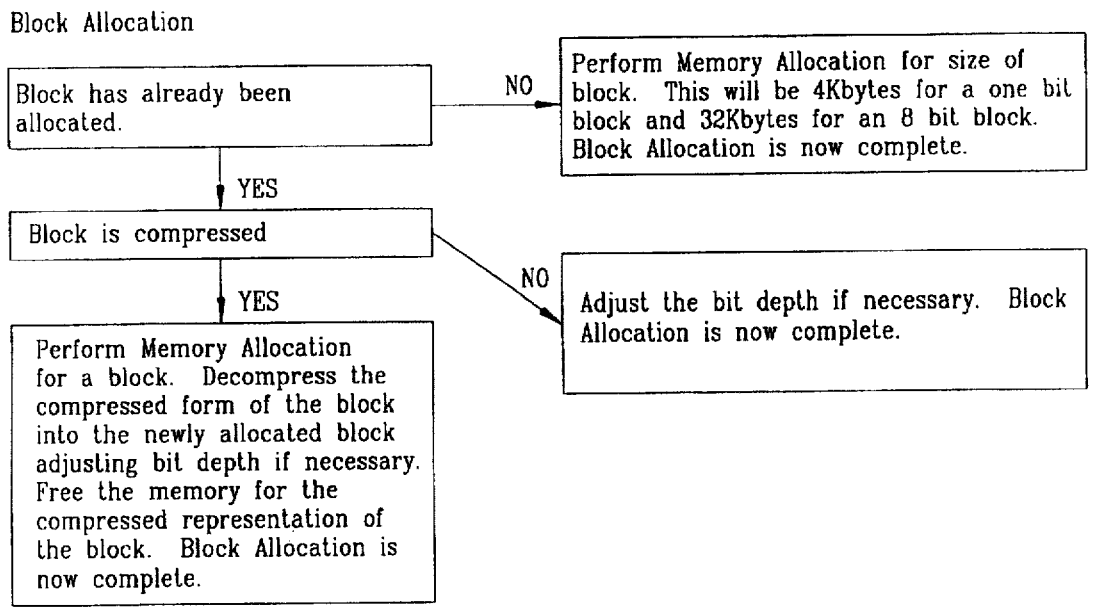
FIG. 5 is a flow diagram of block allocation.

Block allocation is illustrated in more detail in FIG. 5. If the block has not been allocated, it is allocated as required. If the block has already been allocated and it is not compressed, the bit allocation is changed from 1 to 8 or 8 to 1 as called by the result of page creation (FIG. 4). If the block is compressed, it is decompressed with the bit allocation change as required.

Note that Memory Allocation is a very complex process which involves, among other things, the freeing of memory used by printed pages, waiting for pages to print, freeing entries from the font cache, etc. A complete description of this process is neither necessary nor practical. What is worth noting is that blocks comprising page descriptions can be compressed in an effort to make more memory available.

The actual printing process is relatively simple from the perspective of software. A band is composed of 64 scan lines with 5120 pels per scan. Each pel is described by an eight bit byte of data. A block is a variable size (in width and height) piece of memory allocated for the purpose of building bands. The blocks may or may not be contiguous in DRAM memory. Normally software is concerned about the creation of a band of data—implying that the memory used for data storage is contiguous—from the block data. However, the hardware assist on the printer controller handles this band creation by using the VRAM as a holding grounds for the bands. The VRAM is 1 MByte in size and it is broken into three linearly addressed bands.

Figure 6:
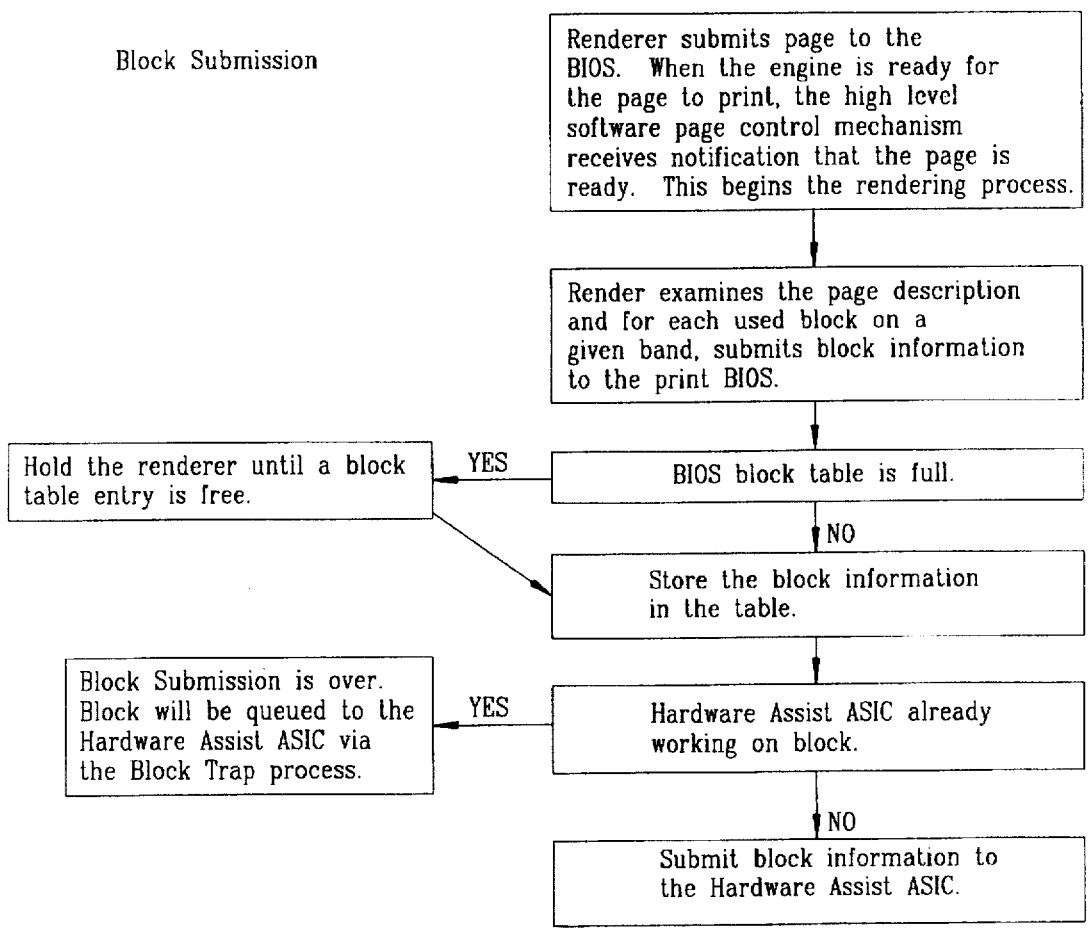
FIG. 6 is a flow diagram of block submission.

Note that in other printers, the block data is moved into the CPU, then into the band and then finally out to the engine. This process requires that the memory bus traffic will be two to three times the data rate required by the engine. On this printer the hardware assist actually creates the band from the blocks. Software describes the blocks to the Hardware Assist ASIC as illustrated in FIG. 6.

The sender submits a page to the operating system of the printer data processor 20 as blocks for each band. These blocks are loaded as a table in DRAM 28. VRAM control ASIC 32 takes its information from that table.

Figure 7:
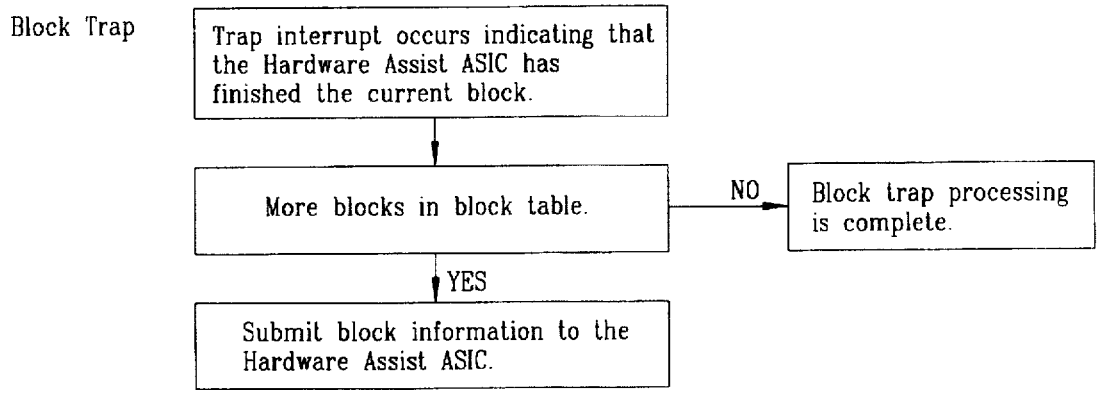
FIG. 7 is a flow diagram of block trap.

The Hardware Assist ASIC interfaces with the VRAM to place the block data into the band. It is important to note that the VRAM is "dumb" in the sense that its interface does not allow simple access of block address within a band. The control for this addressing mode lies within the Hardware Assist ASIC. For each block submission to the hardware ASIC the following information is necessary: the location of the upper left corner of the block in the band, the location of the data stored in DRAM, the width and height of the block, the palette character (value to expand 1 bit data to in an 8 bit representation) for the block, the compressed state of the block and the form of block representation (1 bit or 8 bits). The block is moved from DRAM, with the aid of the Hardware Assist ASIC, into the VRAM where it is serialized to the engine via a private bus shared only between the VRAM and the print engine. Software simply feeds the Hardware Assist ASIC block information for a new block in the page whenever there is data to feed and the Hardware Assist ASIC is idle. This is handled in the Block Trap and Block Submission processes shown in FIG. 7. When the ASIC 32 finishes a current block, it continues until there are no more blocks in the table.

The Block Trap is a high level interrupt handler which submits more blocks to the Hardware Assist ASIC.

The need for low interrupt latency is driven by the engines requirements. The print engine processes a band of data every 26 milliseconds. As an example, if a block size is defined as 64 scans by 512 bytes per scan the VRAM will hold as much as 10 blocks per band in which case we must process a block in at most 2.6 milliseconds. The trap handler is the software interface to the Hardware Assist ASIC for block submission. Again, this allows us to build bands in DRAM with noncontiguous blocks.

Figure 8:
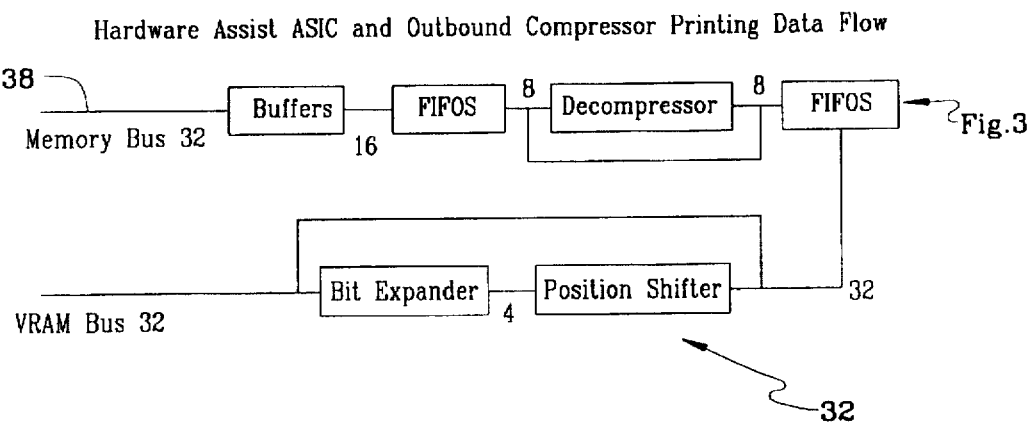
FIG. 8 illustrates the ASIC transfer of print data to the VRAM.

The processing in the Hardware Assist ASIC is a little more complex. The general flow of data is as shown in FIG. 8, which illustrates bus 38 interacting with the buffers, FIFO's and decompressor of FIG. 3, as well as VRAM control ASIC having a position shifter which supplies information to a bit expander.

Rather than attempt to flow chart the operation of the Hardware Assist ASIC and its associated components, a description of its operation for the various types of block data seems most appropriate.

Uncompressed Eight Bit Per Pel

In this mode, data is read in from DRAM into the buffers and through the FIFOS surrounding the decompressor. However, the data is not actually shuttled through the decompressor, but is instead bypassed around it. It is passed through the output FIFOS and around the position shifter and bit expander where it is finally placed on the VRAM data bus. The VRAM Address bus (not shown) is controlled by the VRAM control logic which uses the upper left and lower right block parameters to place the block data at the appropriate address within the VRAM.

Compressed Eight Bit Per Pel

As before, the data is brought in from the memory bus through the buffers and FIFOS surrounding the decompressor. In this case, however, the data is known to be compressed and so the data is shuttled through the decompressor and the output of the decompressor put through the output FIFOS. From the output buffers, the data again passes around the bit expander and position shifter, since it is already eight bits per pel. It is finally placed upon the data bus for writing into the VRAM at the address specified by the VRAM address control logic.

Uncompressed One Bit Per Pel

In this mode, data is read in from the memory bus, brought into the buffers and through the FIFOS surrounding the decompressor. Since the data is uncompressed it is not actually shuttled through the decompressor, but is instead bypassed around it. It is passed through the output FIFOS and buffers and into the position shifter. In the position shifter any small changes in final pel position (up to 3 pel changes) are made. The data passes from there to the bit expander. The bit expander places the palette character on each eight bits of the 32 bit VRAM data bus and then uses the data from the position shifter as the write strobe for each byte. The VRAM Address bus (not shown) is still controlled by the VRAM control logic which uses the upper left and lower right block parameters to place the block data at the appropriate address within the VRAM.

Compressed One Bit Per Pel

In this mode, data is read in from the memory bus, brought into the buffers and through the FIFOS surrounding the decompressor. Since the data is compressed it is shuttled through the decompressor and decompressed. It is passed through the output FIFOS and buffers and into the position shifter where any small changes in pel position are made. The data passes from there to the bit expander. The bit expander places the palette character on each eight bits of the 32 bit VRAM data bus and then uses the data from the position shifter as the write strobe for each byte. The VRAM Address bus (not shown) is still controlled by the VRAM control logic which uses the upper left and lower right block parameters to place the block data at the appropriate address within the VRAM.

The control of the VRAM Address bus is what provides the conversion from blocks to bands in the printing process. The control is implemented in the Hardware Assist ASIC as follows: VRAM devices contain what is called a SAM, or Serial Access Memory, port. The SAM port allows the retrieval of data from the memory part, but this retrieval is not in the random access fashion which the RAM, or Random Access Memory, port of the VRAM provides. Data is stored in the VRAM in rows. Each row is significantly wider than the system memory bus and in general tends to be the square root of the memory part size. This tends to be on the order of 1K though this varies by device. Through the RAM port, the VRAM can supply data from any location in the row followed by any other location in the row. Through the SAM port, however, the VRAM can only supply data for the address following the previous access address. For example, if the user asked for the first word of the first row of data through the SAM port, then the SAM could next supply the second address in the first row in a timely fashion. Access of any other memory location other than the data following the previous access is much slower through the SAM port.

So the SAM port of the VRAM only knows how to retrieve and supply row data in a sequential fashion. This is the port used to supply band data to the print engine. The data which the controller is supplying to the Hardware Assist ASIC, however, is not sequential when viewed from the perspective of band production. Therefore it is the job of the Hardware Assist ASIC to place this non sequential block data into the VRAM in such a way that sequential access through the SAM port supplies appropriate data for the band. This logic lies within the Hardware Assist ASIC and is not a function of the VRAM.

The foregoing has emphasized a specific embodiment. Variations will be apparent and can be anticipated.

We claim:

1. A control system for a printer which requires at least 8 bit level information for each pel comprising a renderer to determine pel information including said level information from printer control information in blocks of predetermined size, each block describing part of a page, data processing means to determine if said level information is at one level for each block, data processing means responsive to said determination of one level to store in a first memory said blocks of one level in one bit for each pel form, means to store level data for each said block stored in one bit for each pel, a second memory to receive bit data and deliver that bit data to said printer for printing, means to store data for printing in said second memory corresponding to data in said first memory with said level information restored for each bit as said at least 8 bits for each pel, said level information being obtained from said level data stored for each block when the corresponding block was stored in one bit for each pel form.

2. The control system as is claim 1 in which said second memory is a VRAM.

3. The control system as in claim 2 also comprising means to compress said blocks stored in said first memory and means to decompress stored block information prior to said storing of data in said VRAM.

4. The control system as in claim 1 also comprising means to compress said blocks stored in said first memory and means to decompress stored block information prior to said storing of data in said second memory.

5. A control system for a printer comprising a renderer to determine pel information from printer control information in blocks, each block describing part of a page, a first memory to store all of said blocks defining a page, data processing means to define the location of said blocks in said first memory in order of the position of the information in said blocks with respect to the page which said blocks define, a second memory having an input for random access and a terminal for serial output to transfer data for printing, and a special purpose integrated circuit responsive to said defined location of said blocks to transfer data for printing to said input of said second memory in order for printing.

6. The control system as in claim 5 in which said second memory is a VRAM.

7. The control system as in claim 5 in which said printer requires at least 8 bit level information for each pel and said renderer determines pel information including said level information, and said control system also comprises data processing means to determine if said level information is at one level for each block, data processing means responsive to said determination of one level to store in said first memory said blocks of one level in one bit for each pel form, and means to store the level information for each said block stored in one bit for each pel form, and in which said special purpose integrated circuit transfers said blocks for printing with said level information restored for each bit as said at least 8 bits for each pel, said level information restored being obtained from said level information stored for each block when the corresponding block was in one bit for each pel form.

8. The control system as in claim 6 in which said printer requires at least 8 bit level information for each pel and said renderer determines pel information including said level information, and said control system also comprises data processing means to determine if said level information is at one level for each block, data processing means responsive to said determination of one level to store in said first memory said blocks of one level in one bit for each pel form, and means to store the level information for each said block stored in one bit for each pel form, and in which said special purpose integrated circuit transfers said blocks for printing with said level information restored for each bit as said at least 8 bits for each pel, said level information restored being obtained from said level information stored for each block when the corresponding block was in one bit for each pel form.

9. The control system as in claim 8 also comprising means to compress said blocks stored in said first memory and means to decompress stored block information prior to said storing of data in said VRAM.

10. The control system as in claim 5 also comprising means to compress said blocks stored in said first memory and means to decompress stored block information prior to said storing of data in said second memory.

11. The control system as in claim 6 also comprising means to compress said blocks stored in said first memory and means to decompress stored block information prior to said storing of data in said VRAM.

12. The control system as in claim 7 also comprising means to compress said blocks stored in said first memory and means to decompress stored block information prior to said storing of data in said second memory.

* * * * *